United States Patent [19]

Breidenstein et al.

[11] 4,229,816

[45] Oct. 21, 1980

[54] TIMING SIGNAL GENERATION AND DISTRIBUTION SYSTEM FOR TDM TELECOMMUNICATIONS SYSTEMS

[75] Inventors: Charles J. Breidenstein, Rochester; Jerome S. Caplan, Henrietta; Bruce G. Littlefield, Honeoye Falls, all of N.Y.

[73] Assignee: Redcom Laboratories, Inc., Fairport, N.Y.

[21] Appl. No.: 42,743

[22] Filed: May 29, 1979

[51] Int. Cl.[2] .............................................. H04J 3/06
[52] U.S. Cl. .................................... 370/100; 370/13; 375/107
[58] Field of Search .......... 179/15 BS, 15 BF, 15 AT, 179/15 AQ; 178/69.1; 325/58

[56] References Cited

U.S. PATENT DOCUMENTS

| | | | |
|---|---|---|---|
| 2,986,723 | 5/1961 | Darwin et al. | 179/15 BS |
| 3,641,474 | 3/1972 | Liberman | 178/69.1 |
| 3,940,558 | 2/1976 | Gabbard et al. | 179/15 BS |
| 3,993,870 | 11/1976 | Schwartz | 179/15 BS |
| 4,156,112 | 5/1979 | Moreland | 179/15 BS |

OTHER PUBLICATIONS

Oswald, "System Century DBX Application Software" Conference Record, vol. 1, International Communications Conference 1977, IEEE Cat. No. 77CH1209-6 CSCB.
Russell, "System Century DBX Real-Time Processing", Conf. Record, vol. 1, International Communications Conference 1977, IEEE Cat. No. 77CH1209-6 CSCB.
Gueldenpfennig, "Conceptual Systems Approach for a Digital PABX", Conference Record 1976, National Telecommunications Conference, IEEE Cat. No. 76 CH1149-4-CSCB.
Gueldenpfennig, "Distributed Control for Switching Systems", Conference Record, National Telecommunications Conference, 1975, IEEE Cat. No. 75 CH1015-7 CSCB.

Primary Examiner—Douglas W. Olms
Attorney, Agent, or Firm—Martin LuKacher

[57] ABSTRACT

Synchronous operation of any number of digital switching units of a TDM system is maintained by interconnecting the switching units to a timing signal highway which distributes timing signals generated by sources of such signals in any one of the units. The units are connected successively in a chain by timing signal distribution control lines. Validity signals are generated and transmitted by circuits in each unit along the lines so as to provide for transmission of timing signals generated in the first switching unit on to the timing signal highway and switch over of the timing signal generating function to successive ones of the units when the timing signal generation in preceding units becomes faulty.

20 Claims, 4 Drawing Figures

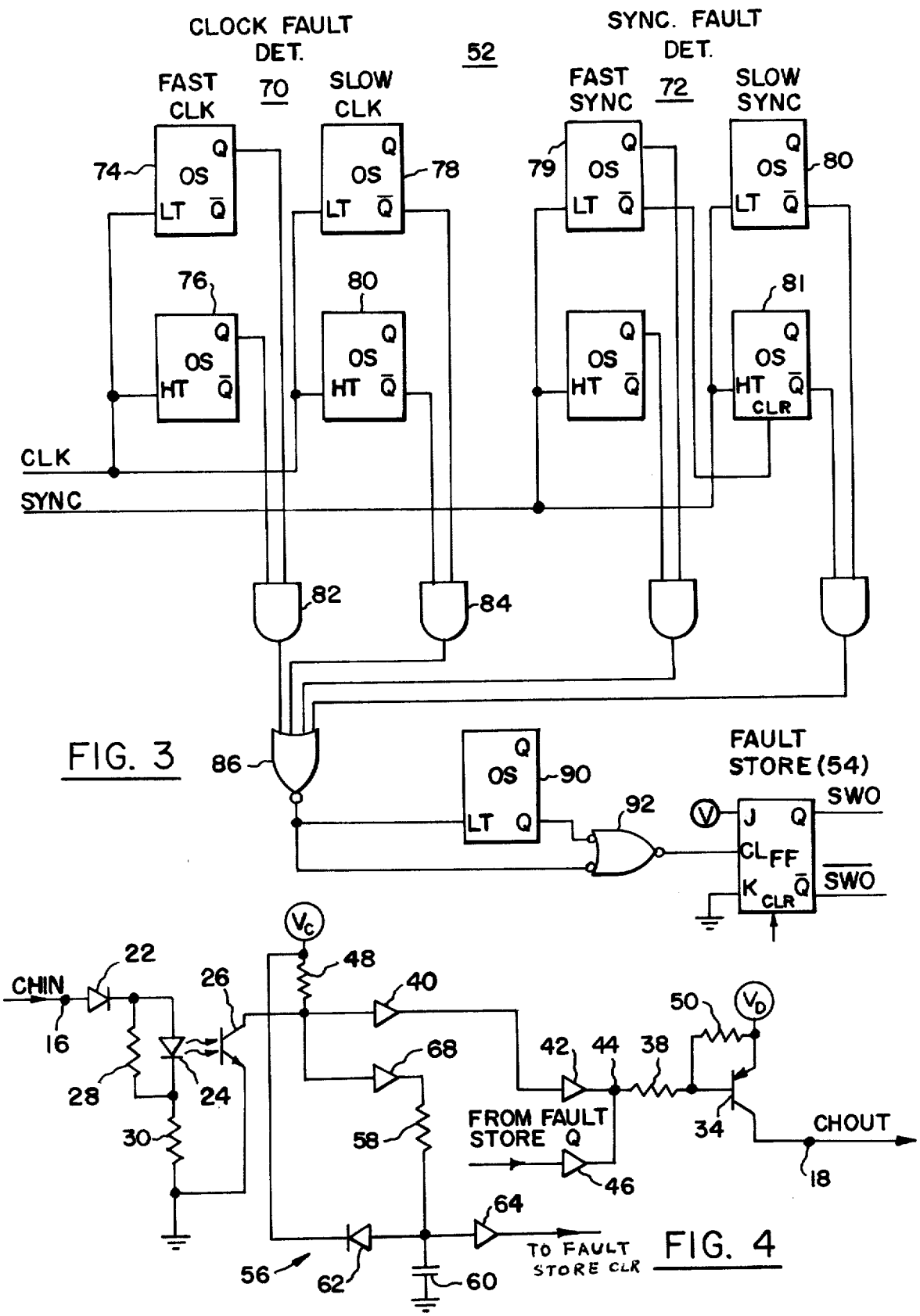

TIMING SIGNAL GENERATION AND DISTRIBUTION SYSTEM FOR TDM TELECOMMUNICATIONS SYSTEMS

DESCRIPTION

The present invention relates to timing signal generation and distribution systems for synchronously operating systems and particularly to a system for the generation of timing signals in TDM telecommunications systems.

The invention is especially suitable for use in TDM telephone switching systems where control and switching functions are distributed among separate modular switching units each of which provides access to and switching of a number of lines, trunks and service circuits such as tone generators and receivers and attendants console positions, and provides connections therebetween. Such a system is described in patent application Ser. No. 042,742 filed concurrently with this application in the U.S. Patent Office, in the names of Klaus Gueldenpfennig and Charles J. Breidenstein, and assigned to the same assignee as this application.

Timing signals which may be generated and distributed in accordance with this invention may be the clock and synchronization or sync signals which are used in providing synchronous operation of the various units of a system. In TDM telecommunications all the time slot interchanges of the numerous switching units of the system must be operated in precise synchronism with each other in order to afford switching without affecting the intelligibility of the signals. Such synchronism can be provided by the frequency standards of high precision, such as atomic clocks. Another approach is to transmit pilot tones from a common source to each unit and lock clock generators in the units to the tone. Such systems are both expensive and unreliable since the failure of a generator means a catastrophic failure, or down condition, of an entire unit. It will be appreciated of course that a single generator supplying all the units would be still less reliable since the failure thereof would mean catastrophic failure of the entire system, not merely a single unit. Synchronization and timing circuitry in order to lock the generators of each unit into synchronism with each other adds to the cost of the system and further increases the number of operating components and decreases the reliability of the overall system, since a single component failure may cause the failure of the system or at least a unit thereof.

It is the principal object of this invention to provide an improved system for the generation and distribution of timing systems in synchronously operative multi-unit systems, such as the units of a TDM telecommunications system, by means of which the foregoing disadvantages may be obviated.

It is a further object of the present invention to provide an improved system for the generation and distribution of timing signals which enhances the flexibility of TDM systems as well as the reliability thereof by avoiding reliance on any individual source of timing signals contained in the system.

It is a still further object of the present invention to provide an improved system for the generation and distribution of timing signals where the failure of less than all of the sources or such timing signals is not catastrophic and orderly switchover to different ones of such timing signal sources is obtained.

It is a still further object of the present invention to provide an improved system for generation and distribution of timing signals which simplifies fault detection and correction of timing signal failures and enables flexibility in the scheduling of maintenance operations.

It is a still further object of the present invention to provide an improved system for the generation and transmission of timing signals by means of which complexity is reduced by avoiding the need to maintain synchronism among several individual timing signal sources.

Briefly described, a system for the generation and distribution of timing signals embodying the invention may be used in and as part of a system such as a time division multiplex system having a plurality of units operable in synchronism with each other. These units are connected to a timing signal bus which distributes the timing signals to the several units. In the case of a TDM system the units are also connected to digital message signal (usually pulse code modulated PCM or delta modulated DM) and control signal highways. A plurality of timing signal validity signal lines interconnect the units as in a chain. The units contain separate validity signal generation and transmission circuits and separate timing signal generators in each of them. The circuits have inputs and outputs. The signal validity lines are connected between the inputs and outputs; thus completing the chain or successive connection among the units via the validity lines. The validity signal generation and transmitting circuits contain means responsive to the presence of a validity signal at the input thereof and the valid operation of the timing signal generating means therein for providing or relaying a validity signal to the output of the circuits. The validity signal at the output is provided when either the validity signal at the input of the circuit is present or the timing signal generating means of the unit containing the circuit is operating validly (e.g., at a certain frequency and within tolerances). When the validity signal is not present at the input of the circuit, the circuit is operative to enable the application of the timing signals which are internally generated in the unit to the timing signal bus for distribution to all of the other units. Accordingly, the distribution system enables the switchover to timing generators in successive ones of the units. The reliability of the overall system is enhanced since timing signal sources equal in number to the number of units are redundantly available to provide timing signals for the entire system. Also since a single timing signal generator provides the timing signals for the entire system, synchronous operation with the frequency accuracy within specified tolerances is automatically obtained.

The foregoing and other objects, advantages and features of the invention as well as a presently preferred embodiment thereof will become more apparent from a reading of the following description in connection with the accompanying drawings in which:

FIG. 3 is a simplified block diagram of the fault detector and fault store of the circuits shown in FIG. 2; and FIG. 4 is a more detailed diagram of the validity signal distribution circuitry of the circuits shown in FIG. 2.

Figure 1:
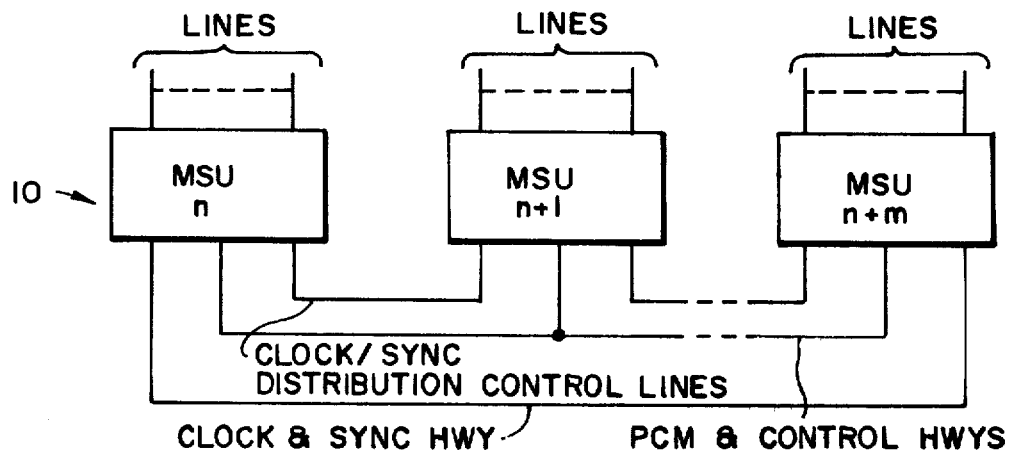
FIG. 1 is a block diagram of a TDM telecommunications system which embodies the invention.

Referring first to FIG. 1, there is shown a TDM telecommunications system 10 made up of several digital switching units. There are a plurality of such switching units in the system. The number of switching units depends upon the number of lines between which interconnections can be made. The system may be distributed with each switching unit having its own microprocessor for processing of calls and establishing connections in the time slot interchange thereof. Such a system which may for example be embodied with eight switching units which are modular and self-contained, is described in the above referenced copending patent application filed in the name of Klaus Gueldenpfennig and Charles J. Breidenstein. The digital switching units are therefore called MSU's. Alternatively, the system 10 may be operative with one or more central processing units (CPU's) which process the calls and establish connections between lines, between trunks and between lines and trunks, or to service circuits such as tone generators and receivers, attendant consoles, and the like. A survey of the switching systems of the type in which the invention may be embodied may be found in Telephony Magazine, Vol. 195, No. 13, Page 42, et seq, (Sept. 25, 1978).

The digital switching units in the system 10 are shown as being n+m in number. The first of these units is indicated as MSU n. The next successive unit is MSU n+1. This system contains additional units successive to MSU n+1 up to and including MSU n+m. The MSU's are connected to a timing signal highway which carries and distributes timing signals, which in this embodiment of the invention are clock and other synchronizing (sync) signals among the MSU's. These clock and sync signals provide timing and coherent or synchronous operation of the time slot interchanges in the MSU's. They may also provide for synchronous operation of CPU's, if necessary.

The MSU's are also connected to highways which carry message and control signals. The message signals are typically digitally modulated and may be PCM or DM signals. PCM highways for message signals are indicated. The control highways are also highways which carry digital signals as between interfaces in the switching units and to the processing units therein or associated therewith.

A plurality of timing signals (clock/sync) distribution control lines are connected between successive ones of the MSU's. These lines interconnect the MSU's via a bus. Other signals which may be called validity signals represent the operating condition or state of the generators of timing signals which are contained in each of the MSU's or indicate that a preceding MSU has a timing generator which is not faulty and is supplying clock and sync signals to all of its succeeding MSU's. It can be seen that the MSU's are connected in a chain via the validity signal lines.

Figure 2:
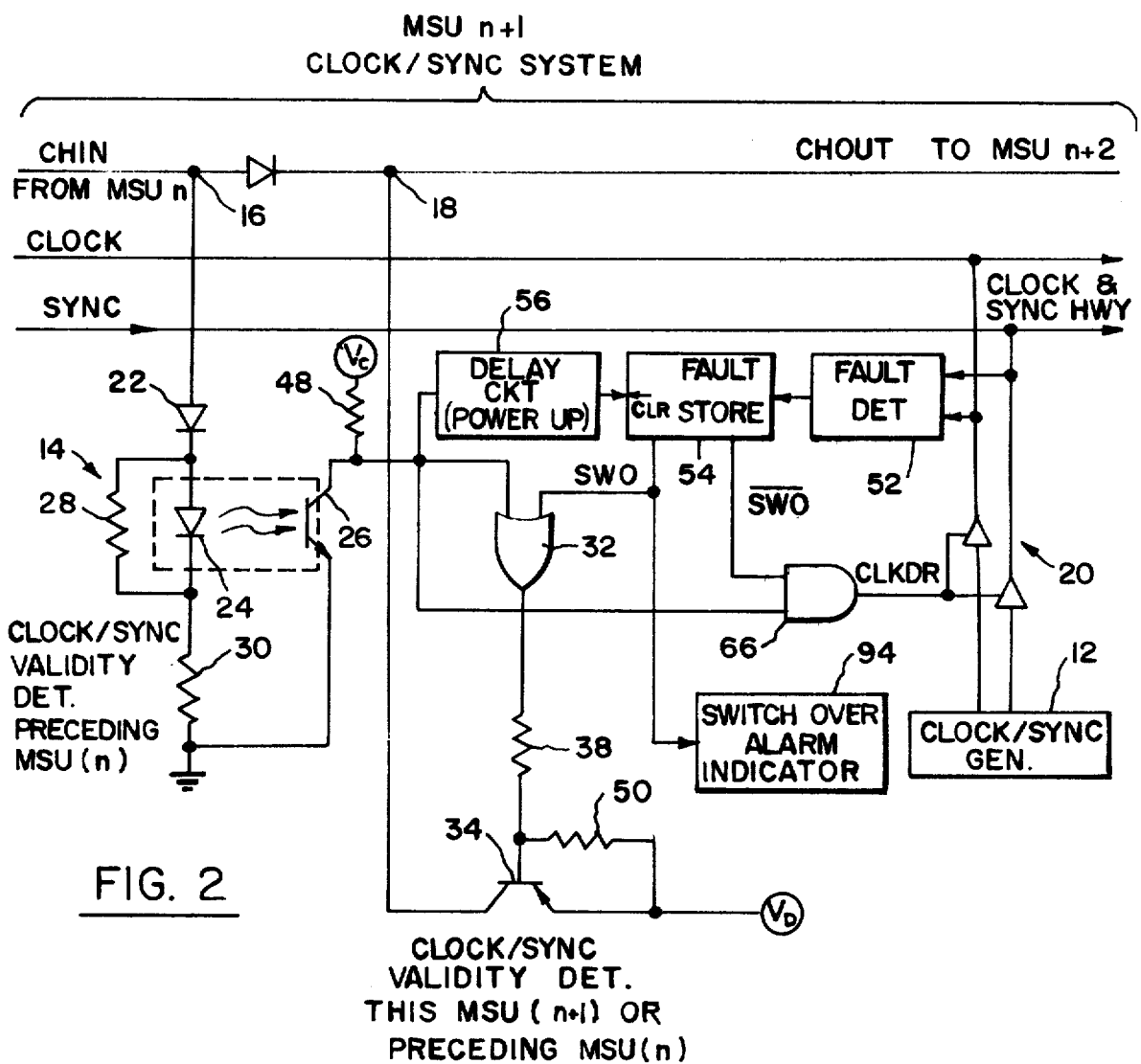
FIG. 2 is a schematic diagram of the validity signal generation and transmission circuits and timing signal generation circuits in one of the units of the system shown in FIG. 1 which is indicated as being the (n+1) unit.

The validity signal input to a MSU, such as MSU n+1 shown in FIG. 2, is the line from its preceding MSU and is the chain input (CHIN) line. The validity signal output from the MSU to its next succeeding MSU (MSU n+2) is the chain output line (CHOUT). The lines carry the validity signals representing whether or not the clock/sync signals which are produced by clock/sync generators 12 in either that MSU or its preceding MSU's are faulty. These signals are a voltage level. In this example, the level is a positive voltage with respect to logic ground when the clock/sync signals are not faulty and a ground level when these clock and sync signals are faulty.

Each MSU has a circuit 14 for the generation and transmission of these validity signals. This circuit 14 has an input terminal 16 to which the CHIN line to the MSU is connected and an output terminal 18 to which the CHOUT line to the next succeeding MSU is connected. A clock and sync bus or highway among the MSU's is provided and the clock sync generator of the MSU is connected to the bus through driver amplifiers 20, when these amplifiers are enabled.

The circuit 14 includes a diode 22 polarized to pass the validity signal level to a light emitting diode 24 which is optically coupled to a phototransistor 26. Resistors 28 and 30 set the voltage across the light emitting diode 24. When the level at the input terminal 16 indicates a valid clock/sync signal from any of the preceding MSU's, the diode 24 emits light. This preceding MSU will be MSU n in this exemplary case. It will be appreciated that there may be other MSU's still further preceding MSU n in the chain or succession of MSU's which are connected by the distribution control lines.

The phototransistor 26 is rendered conductive by the light from the diode 24 when the control signal from the CHIN line represents a valid condition. Then the collector of the phototransistor 26 is effectively connected to ground, and a logic low is transmitted through an OR gate 32 to the base of an output transistor 34 by way of a coupling resistor 38. The output transistor is a PNP transistor. When the logic low or ground signal is applied to the base, the output transistor 34 conducts and connects a source of voltage which is positive and at the level representing the valid condition to the output terminal 18. This level is then transmitted over the CHOUT line to the next successive MSU.

As shown in FIG. 4, digital amplifiers 40 and 42 may be used to provide isolation between the phototransistor 26 and the output transistor 54. The junction 44 between one of these amplifiers 42 and another digital amplifier 46 provides the OR gate 32.

In the absence of a valid signal at the input terminal 16, the collector of the phototransistor 26 is maintained at a positive level due to voltage from a source indicated as Vc in FIG. 4 which is applied to the collector to a resistor 48. Then the base of the output transistor 34 will be maintained at a high or positive level with respect to its emitter by virtue of the biasing arrangement provided by the resistor 38 and another resistor 50. The transistor 34 will then be cut off and the low level, at essentially ground, is applied to the output terminal 18. The existence of the low level indicates that the clock and sync signals from the generators of clock and sync signals in all the preceding MSU's is faulty. The low level will be maintained if the clock and sync generator 12 in this MSU is also faulty since a high (positive) level is transmitted via the amplifier 46 and the junction 44 which provides the OR gate 32.

The circuit 14 also has a fault detector 52 which is connected to the clock and sync highway at the output of the drivers 20. When either the clock or sync signls produced by the generator 12 is faulty, the detector 52 provides an output, and information that the clock/sync generator 12 is faulty is stored in a fault store 54. This fault store, unless it is cleared by a level applied to its CLR input from a delay circuit 56, produces a switchover output SWO. SWO is a logic high (positive) level when a fault condition is stored in the fault store 54. This high level is transmitted by the OR gate 32 and applied to the output transistor 34 to render it non-conductive. An indication that the clock sync generator 12 is faulty is then provided at the output terminal 18 and transmitted along the CHOUT line.

The delay circuit 56 is shown more particularly in FIG. 4 as being a charging circuit including a resistor 58 and a capacitor 60. A diode 62 provides a discharge path for the capacitor 60. When power is initially turned on to the MSU or when the collector 26 initially rises to the positive level of the operating source $V_c$, as occurs when the valid signal ceases, a logical low level is forwarded to the CLR input of the fault store by a digital amplifier 64 so as to maintain the fault store in a clear condition, indicative of no fault in the clock sync generator 12 having been detected. At that point in time the SWO output from the fault store 56 and the collector of the phototransistor 26 are both high. An AND gate 66 is then enabled to output the CLKDR voltge. The driver amplifiers 20 are then enabled. The clock and sync signals now can be presented to the fault detector 52 which can determine if the local clock and sync generator 12 in the MSU (MSU n+1) is operating properly or is faulty. After a delay time, suitably about 300 microseconds, the charging voltage from the source at $V_c$ is applied through another differential amplifier 68 so as to charge up the capacitor 60. The capacitor output voltage becomes positive which enables the fault store to be set when a fault is detected by the detector 52.

The AND gate 66 also provides means for enabling the clock/sync generator 12 to put out clock and sync signals onto the clock and sync bus or highway when the clock and sync signals are not being transmitted from one of the preceding MSU's. Then the CLKDR output remains high such that the drivers 20 remain enabled. On the other hand, a valid signal at the input terminal 16 will produce a low output at an input of the AND gate 66 such that the driver amplifiers 20 are inhibited and the clock and sync generation function is provided by a preceding MSU, the clock sync generator of which transmits the clock and sync signals along the clock and sync bus or highway.

The fault detector 52 and the fault store 54 are shown in greater detail in FIG. 3. Consider first that the clock signal may be a high frequency clock at the bit rate of the TDM signals, e.g., 2.048 MHz. The sync signals may be derived from the clock signals by means of dividers and is outputted at the frame rate of the TDM messages. The frame rate may be for example, 1/256th the clock rate. Separate detectors are used to determine if the frequency or duty cycle of the clock varies by more than a given tolerance from the desired clock frequency and whether the freuency or pulse width of the sync signals varies beyond the given tolerance from the desired sync frequency and pulse width. These are referred to as the clock fault detector 70 and the sync fault detector 72. Each of these detectors is similar except for the pulse widths which they are set to detect. Accordingly, only the clock fault detector 70 will be described in detail. This detector 70 has a first pair of one- shots 74 and 76 and a second pair of one-shots 78 and 80. The timing interval of these one-shots is set to be approximately equal to one-half the period of the clock signals plus whatever tolerance in the period of these signals is allowed. The clock is typically a square wave having 50% duty cycle. The rising or high-going edges (which may be termed the leading edge) of these clock signals and the falling or low-going edges (which may be termed the trailing edge) of these clock signals are therefore separated by one-half the period of the clock signals.

The first pair of one-shots 74 and 76 and the second pair of one-shots 78 and 80 have inputs which enable triggering on either the low-going (LT) or high-going (HT) edges of a trigger pulse applied thereto. The high-going edge trigger is used for one of these one-shots and the low-going edge trigger for the other. The first pair of one-shots 74 and 76 is designed to detect a fast clock (viz., of frequency greater than the desired frequency plus the tolerance). This fast clock detection is obtained by connecting the Q outputs of the one-shots, which are the outputs which go high when the one-shots are triggered, to an AND gate 82. The other pair of one-shots 78 and 80 serves as a slow clock detector and their $\overline{Q}$ outputs, which are high when the one-shots are not triggered, are connected to another AND gate 84.

In the absence of any clock signal neither one-shot 78 or 80 of the slow clock detector will be triggered. The $\overline{Q}$ outputs then remain high and the AND gate 84 provides an output to an inverting OR gate 86. If the clock signal is slow the period of time when the $\overline{Q}$ outputs remain high (viz., when the one-shot 78 and 80 are not triggered) overlap each other and a sequence of pulses is outputted by the AND gate 84 and applied to an input of the gate 86. Similarly, if the clock frequency is fast the period of time where the one-shots 74 and 76 are set after being triggered overlap. The Q outputs of these flip-flops 74 and 76 then overlap and the AND gate 82 will provide a sequence of pulses. Accordingly, the negative OR gate 86 will provide a sequence of pulses beginning with a low or negative-going edge or a low or negative level when either the clock or sync signals are absent or when either of them is of higher or lower frequency (viz., fast or slow) than their desired frequencies.

The sync fault detector 72 utilizes the same principle of operation as the clock fault detecter. However, because the duty cycle is so short (less than 0.5%) an additional connection from the $\overline{Q}$ output of the one shot 79 in the fast sync detection circuits is connected to the clear input of the one-shot 81 in the slow sync detection circuit.

The one-shots 79 and 83 corresponding to the one-shots 74 and 78 of the clock fault detector 70 are the fast (short) and slow (long) pulse width detectors respectively. These are designed to accept pulse widths within the tolerance window (allowable interval of time) around the nominal pulse width. The one-shots 85 and 81 corresponding to one-shots 76 and 80 of the clock fault detector are are the fast and slow frequency detectors of the sync fault detector 72, respectively.

The major operational difference between the clock and sync fault detectors is that the slow sync frequency one-shot is cleared by the $\overline{Q}$ output of the fast sync pulse width one-shot. (The clock fault detector is free running). This is to prevent false acceptance of a long sync pulse width.

Another one-shot 90 which produces an output pulse of approximately 200 microseconds duration when triggered by a negative-going edge or negative level is connected to the output of the gate 86. An inverting NOR gate 92 is input connected to the $\overline{Q}$ output of the one-shot 90 as well as the output of the gate 86. The one-shot 90 serves to convert the pulses indicative of a fault condition to a low logic level. The gate 92 provides a low logic level when either the Q output of the one-shot 90 is low or a low logic level is produced by the gate 86. This low logic level from the gate 92 provides the output of the fault detector 52. In the absence of a fault, the one-shot 90 will be reset. The high logic level at the input of the gate 92 will result in a high level at the output thereof indicative of the absence of a fault condition. The fault store 54 may be a JK flip-flop which is set only by the negative level indicative of the fault condition. The flip-flop 54 may not be set if a negative level is applied to its clear input as explained above. When set the flip-flop outputs the SWO or switch-over output as a high level from its Q output. The $\overline{Q}$ output, $\overline{SWO}$ is then low so as to inhibit the AND gate 62 (FIG. 2) from providing the CLKDR signal which enables the transmission of the clock and sync signals from the generator 12. In the event that a fault condition is stored in the fault store flip-flop, the SWO output operates a switch-over alarm indicator 94 (FIG. 2) which may be a light emitting diode. The illumination of this diode provides an indication that the clock /sync generator 12 in the MSU in which that clock/sync generator is contained, is faulty and requires maintenance. The system continues to maintain a high degree of reliability of operation inasmuch as there are other generators, one for each of the other MSU's which has a very high probability of being in proper operating condition and capable of generating and transmitting the clock and sync signals. Catastrophic failure of the system 10 by virture of the failure of the timing signals therein is thus substantially eliminated.

From the foregoing description it will be apparent that there has been provided an improved system for the generation and transmission of clock/sync and other timing signals in a multi-unit system. While the clock and sync generation features provided by the invention is especially suitable for use in TDM telecommunication systems, other applications thereof as well as variations and modifications in the hereindescribed system, within the scope of the invention, will undoubtedly suggest themselves to those skilled in the art. Accordingly, the forgoing description should be taken as illustrative and not in a limiting sense.

We claim:

1. For use in a time division switching system having a plurality of synchronously operable switching units connected to highways carrying messages, control signals and timing signals, a system for generating and distributing said timing signals which comprises
   a plurality of lines interconnecting said units successively in a chain,
   separate sources of said timing signals in each of said units,
   separate fault detection means in each of said units responsive to the operation of the source therein for applying a signal representing whether or not the source therein is faulty to the one of said plurality of lines to its next succeeding one of said units,
   timing signal validity detecting means in each of said units, connected to the one of said lines to its immediately preceding one of said units and responsive to the signal thereon for applying said signal to said one of said lines to its next succeeding one of said units, said signal also representing whether or not the sources in all of its preceding units are faulty,
   means in each of said units, operated by said validity detecting means therein when said signal on said one of said lines to its immediately preceding one of said units is representative of said sources in all of its preceding units being faulty, and also operated by said fault detection means therein when said source therein is not faulty for enabling the transmission of said timing signals from said source therein onto said timing signal highway.

2. The invention as set forth in claim 1 further comprising means interconnecting said lines and bridging said units for relaying said signals which represent the presence of one of said sources in a preceding one of said units not being faulty.

3. The invention as set forth in claim 1 wherein said timing signal validity detection means includes means responsive to the temporary presence of said signal representing that the sources in all of its preceding units are faulty for at least temporarily operating said means for enabling the transmission of said timing signals from said source therein to said timing signal highway.

4. The invention as set forth in claim 1 wherein said timing signal validity detecting means comprises means connected to the one of said lines from the immediately preceding one of said units for detecting the presence of a logic level representing said signal thereon and for applying a logic level corresponding to said detected level upon the one of said lines to the next succeeding one of said units when said logic level is present.

5. The invention as set forth in claim 4 wherein said means for the detection of the presence of said level comprises an input transistor coupled to said line from said immediately preceding unit and responsive to said level thereon, an output transistor having a base and an emitter and collector, a source of operating voltage of magnitude equal to the magnitude of said level connected to the one of said lines to the next succeeding unit through said collector and emitter of said output transistor, to apply voltage from said source to said last-named line when said output transistor conducts, and means connecting said input transistor to said base of said output transistor for rendering said output transistor conductive only when said level is applied to said input transistor.

6. The invention as set forth in claim 5 wherein said input transistor is a photo transistor, a light emitting diode optically coupled to said photo transistor, said diode being connected to said line from said preceding unit and illuminated in response to the presence of said level to apply said level to said phototransistor.

7. The invention as set forth in claim 1 wherein said fault detection means comprises means responsive to the frequency of said timing signal to provide said signals representing whether or not said source is faulty when said frequency deviates from a predetermined frequency by a given extent.

8. The invention as set forth in claim 7 wherein said timing signals comprise clock signals having generally square waveforms, said fault detection means comprises separate pairs of one shots and responsive to increases and decreases in the frequency of said signals from a predetermined frequency respectively, each of said one shots having outputs which are of relatively opposite level and which switch levels when triggered, means for triggering the one shots of each said pair separately on the increasing and decreasing edges of said square wave of said clock signals, separate AND gates coupled to outputs of said first pair which are of the one of said opposite levels and to the outputs of said second pair which are of the other of said levels for providing outputs representative of the frequency of said clock signals deviating from said predetermined frequency, and means responsive to the output from said gates when said outputs represent deviations from said predetermined frequency to produce said signal representing whether or not said source is faulty.

9. The invention as set forth in claim 1 wherein said fault detection means comprises means responsive to the timing signals produced by said source for providing at least one output representing that said source is faulty, means for storing said output, and means responsive to said stored output and to said signal on said line connected to said immediately preceding one of said units from said validity detecting means for providing said signal to said next succeeding one of said lines representing that timing signals on said highway are faulty when both said output from said storing means and said signal from said validity detecting means represents said faulty timing signals and providing said signal from said detecting means to said next succeeding one of said lines as representing said timing signals being valid when any of said validity detecting means signal and said storing means output represents valid timing signals from said source in any of said unit and its preceding units.

10. The invention as set forth in claim 9 further comprising means for maintaining said storing means clear of output signals representing faulty timing signals for a predetermined time after said signal on said line to said preceding one of said units commences being a signal representing faulty timing signals.

11. The invention as set forth in claim 10 wherein said clear maintaining means includes means responsive to initial application of power to said unit which also operates said clear maintaining means to inhibit response of said storing means to said fault representing output signals for said period of time after said initial application.

12. In a system having a plurality of units operable in synchronism with each other, a system for the generation and distribution of timing signals which comprises a timing signal bus connected to each of said units for distributing said timing signals thereto, a plurality of timing signal validity signal lines, separate validity signal generation and transmission circuits in each of said units, said circuits having inputs and outputs, said signal validity lines being connected between said inputs and outputs such that said units are connected in succession via said validity lines, each of said units having means for generating said timing signals, said validity signal generation and transmission circuits comprising means responsive to the presence of a validity signal at said input and the valid operation of said timing signal generating means for providing a validity signal at said output when at least one of said validity signals at said input and valid operation of said generating means is present, and means for applying the timing signals from said generating means to said bus when said validity signal at said input is absent.

13. The invention as set forth in claim 12 wherein said validity signal generation and transmission circuits further comprise means responsive to said timing signals generating means for detecting when said timing signals are faulty, and means responsive to said faulty timing signal detecting means and said validity signal at said input for inhibiting said means for applying said timing signals from said generating means when said validity signal at said input is present or said timing signals are faulty.

14. The invention as set forth in claim 13 wherein said validity signal generation and transmission circuits further comprise means for delaying the operation of said inhibiting means for a time sufficient to operate said faulty timing signal detecting means after power is applied to said circuits and after said validity signal at said input ceases to be present.

15. The invention as set forth in claim 12 further comprising means connected between said inputs and outputs of each said circuits providing for the unilateral transmission of said validity signal at said input to said output.

16. The invention as set forth in claim 15 wherein said validity signal is a voltage level of one polarity, and said means connected between said inputs and outputs of each said circuits in a diode polarized to pass current from said input to output when said input is at a voltage level of said polarity.

17. The invention as set forth in claim 13 wherein said faulty timing signal detecting means comprises means for detecting when the pulse width of said timing signals deviates from a predetermined range of pulse width including for each of said timing signals, a first pair of one shots one of which is triggered by the timing signal on the leading edge thereof and the other of which is triggered by the timing signal on the trailing edge thereof, a second pair of one shots one of which is triggered by the timing signal on the leading edge thereof and the other of which is triggered by the timing signal on the trailing edge thereof, gate means connected to the outputs of said first pair of one shots which are of one level and to the outputs of said second pair of one shots which are of different level when said one shots are triggered for providing a gate means responsive to said gate means output for providing an output indicating faulty itming signals when said gate means output occurs.

18. The invention as set forth in claim 13 including means responsive to said faulty timing signals detecting means for providing storage of the detection of a faulty timing signal condition, and means for generating said validity signal in response to the storage of said condition or the absence of said validity signal at said input, said generating means being connected to said circuit output for transmission over the one of said plurality of validity signal lines connected thereto.

19. The invention as set forth in claim 18 further comprising means for clearing said storing means when said validity signal applied to said circuit input ceases to be present or upon application of power to said circuit.

20. The invention as set forth in claim 18 wherein validity signal is a voltage level of one polarity, said means for providing said validity signal at said output comprising a light emitting diode and a phototransistor optically coupled to each other, an output transistor having an emitter and collector, a source of voltage level of said one polarity, said light emitting diode being connected to said circuit input for activation by said voltage level when present, said phototransistor and output transistor being connected to render said output transistor conductive when said diode is activated for connecting said source to said circuit output via said emitter and collector of said output transistor, said storing means being a flip-flop having an output which is set to said voltage level when said condition is stored, said flip-flop output being connected to said output transistor for also rendering said output transistor conductive.

* * * * *